(12) United States Patent
Boggs et al.

(10) Patent No.: US 6,763,298 B2
(45) Date of Patent: Jul. 13, 2004

(54) CONTROLLED ENGINE SHUTDOWN FOR A HYBRID ELECTRIC VEHICLE

(75) Inventors: David Lee Boggs, Bloomfield Hills, MI (US); Jerry D. Robichaux, Tucson, AZ (US); Mark William Peters, Wolverine Lake, MI (US); Stephen John Kotre, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 09/682,980

(22) Filed: Nov. 5, 2001

(65) Prior Publication Data

US 2002/0165659 A1 Nov. 7, 2002

Related U.S. Application Data

(63) Continuation-in-part of application No. 09/848,492, filed on May 3, 2001.

(51) Int. Cl.[7] .................................................. F02B 77/00
(52) U.S. Cl. ........................ 701/112; 701/105; 701/102; 123/198 DB; 477/187
(58) Field of Search ................................ 701/112, 105, 701/114, 110, 115, 102; 123/198 DB, 516, 520; 180/197, 65.1, 65.2, 65.3; 477/187

(56) References Cited

U.S. PATENT DOCUMENTS

| | | | |
|---|---|---|---|
| 4,312,310 A | 1/1982 | Chivilo' et al. | |
| 4,366,790 A | 1/1983 | DeBoynton | |
| 4,367,720 A | 1/1983 | Miyoshi et al. | |
| 4,574,752 A | 3/1986 | Reichert, Jr. et al. | |
| 4,653,445 A | 3/1987 | Book et al. | |
| 5,255,733 A | * 10/1993 | King | 180/65.3 |
| 5,343,970 A | 9/1994 | Severinsky | |
| 5,357,935 A | 10/1994 | Oxley et al. | |
| 5,713,425 A | 2/1998 | Buschhaus et al. | |
| 5,725,064 A | 3/1998 | Ibaraki et al. | |
| 6,116,363 A | * 9/2000 | Frank | 180/65.2 |
| 6,356,042 B1 | 3/2002 | Kahlon et al. | |
| 6,425,365 B1 | * 7/2002 | Peters et al. | 123/198 DB |
| 6,434,453 B1 | * 8/2002 | Kuroda et al. | 701/112 |
| 6,604,502 B1 | * 8/2003 | Bisaro et al. | 123/198 DB |
| 2002/0061802 A1 | * 5/2002 | Chung | 180/65.4 |

FOREIGN PATENT DOCUMENTS

| | | |
|---|---|---|
| GB | 2346020 | 7/2000 |
| JP | 11257119 | 9/1999 |
| WO | WO 01/71181 A2 | 9/2001 |

* cited by examiner

Primary Examiner—Hieu T. Vo
(74) Attorney, Agent, or Firm—Brooks & Kushman PC; Carlos L. Hanze

(57) ABSTRACT

A method and system to control engine shutdown for a hybrid electric vehicle (HEV) is provided. Tailpipe emissions are reduced during the many engine shutdowns and subsequent restarts during the course of an HEV drive cycle, and evaporative emissions are reduced during an HEV "soak" (inactive) period. The engine shutdown routine can ramp off fuel injectors, control engine torque (via electronic throttle control), control engine speed, stop spark delivery by disabling the ignition system, stop purge vapor flow by closing a vapor management valve (VMV), stop exhaust gas recirculation (EGR) flow by closing an EGR valve, and flush the intake manifold of residual fuel (vapor and puddles) into the combustion chamber to be combusted chamber to be combusted. The resulting exhaust gas byproducts are then converted in the catalytic converter.

16 Claims, 4 Drawing Sheets

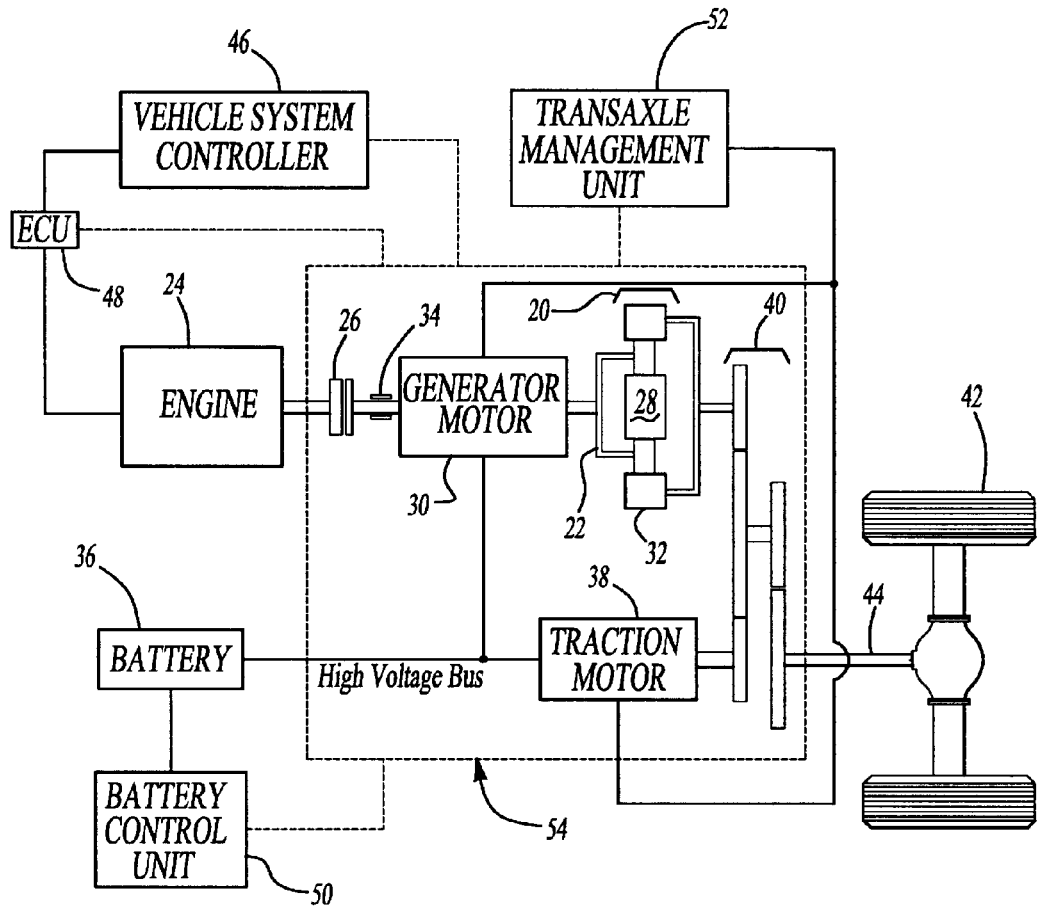
_Fig-1_
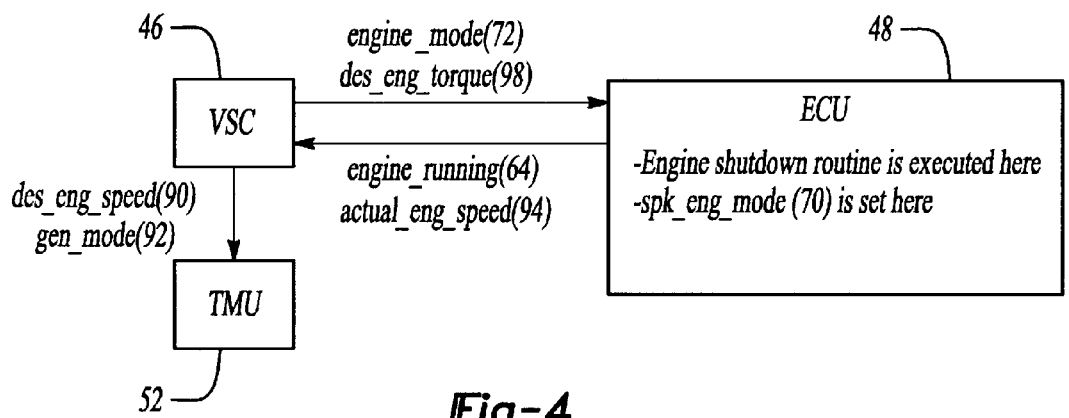
_Fig-4_

CONTROLLED ENGINE SHUTDOWN FOR A HYBRID ELECTRIC VEHICLE

CROSS REFERENCE TO RELATED APPLICATIONS

This application is a continuation-in-part to a non-provisional application Ser. No. 09/848,492 titled, "Controlled Engine Shutdown for a Hybrid Electric Vehicle" filed May 3, 2001. The entire disclosure of Ser. No. 09/848,492 is incorporated herein by reference in its entirety.

BACKGROUND OF INVENTION

1. Field of Invention

The present invention relates generally to a hybrid electric vehicle (HEV), and specifically to a method and system to control an HEV engine shutdown.

2. Discussion of Prior Art

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drive-ability. The HEV allows the use of smaller engines, regenerative braking, electric boost, and even operating the vehicle with the engine shutdown. Nevertheless, new ways must be developed to optimize the HEV"s potential benefits.

One such area of HEV development is implementing a controlled engine shutdown in an HEV. If the engine shuts down in an uncontrolled manner, its starts and stops throughout a given HEV drive cycle can increase tailpipe emissions from inconsistent amounts of residual fuel (vapor and puddles) in the intake manifold from one shutdown to the next. The amount of residual fuel depends on the amount of liquid fuel flow from the injectors, as well as the amount of fuel vapor introduced by the vapor management valve (VMV) and exhaust gas recirculation valve (EGR) prior to the shutdown.

Vapor management valves (VMV) are widely used in evaporative emission control systems to reduce the fuel vapor build up in the fuel system. Fuel vapor in the fuel tank and lines is captured in a vapor storage canister (typically a charcoal material), and then drawn out into the engine's intake manifold via the VMV. The amount of fuel vapor introduced into the intake manifold, and thus into the engine cylinders to be combusted, is proportional to how much the VMV is opened and how much intake manifold vacuum is available.

Exhaust gas recirculation valves (EGR) are widely used in tailpipe emission control systems to recirculate a portion of the hot exhaust gases back into the intake manifold, thereby diluting the inducted air/fuel mixture and lowering combustion temperatures to reduce the amount of NOx (oxides of nitrogen) that are created. The amount of exhaust gases re-circulated into the intake manifold, and thus into the cylinders, is proportional to how much the EGR valve is opened and how much intake manifold vacuum is available. Though mostly made up of inert byproducts of the previous combustion event, the exhaust gases partially contain some unburned fuel vapor.

During engine shutdown in an HEV drive cycle, the fuel injectors, VMV, and EGR valves may be flowing at different rates depending on when the shutdown occurs, and thus may contribute fuel vapor and puddle amounts to the intake manifold that vary from one engine shutdown to the next. This, in turn, leads to inconsistent amounts of residual fuel left in the intake manifold from one subsequent engine restart to the next. Because of the many engine shutdowns and starts in an HEV, it is important to minimize the amount of tailpipe emissions during these events.

Nevertheless, with an inconsistent amount of residual fuel vapor and puddles, it becomes difficult to deliver the proper amount of fuel through the injectors from one engine start to the next during the course of a drive cycle. Thus, tailpipe emissions may vary from one engine start to the next during a drive cycle.

A controlled engine shutdown routine can also reduce evaporative emissions following a "key-off" engine (and vehicle) shutdown at the end of a drive cycle. One significant contributor to evaporative emissions in conventional vehicles during a "soak" (i.e., the time between drive cycles where the vehicle is inactive and the engine is off) is residual fuel vapor that migrates to the atmosphere from the intake manifold through the vehicle's air induction system. By reducing the residual fuel from the intake manifold, evaporative emissions can be reduced during the vehicle "key-off" soak periods following a drive cycle.

To accomplish this, a "power sustain" function is needed to continue to provide power to HEV controllers, ignition system, and fuel system (pump and injectors) for a period of time after "key-off." This allows the generator to continue to spin the engine (after injectors are ramped/shut off) while the spark plugs continue to fire until residual fuel (vapor and liquid) is flushed from the intake manifold into the combustion chamber to be combusted (even if partially), and then moved on (delivered) into the hot catalytic converter to be converted.

Although controlled engine shutdowns are known in the prior art, no such controlled engine shutdown strategy has been developed for an HEV. U.S. Pat. No. 4,653,445 to Book, et al., discloses a control system for engine protection to different threatening conditions. Examples of such conditions include fire, the presence of combustible gas or fuel, rollover or excessive tilt, low oil pressure, low coolant level, engine overheating, or engine overspeed.

Book"s engine shutdown system receives warning signals for fault conditions that initiate engine shutdown. Book also includes a method to divide fault signals into either a fast shutdown response or a delayed shutdown response. This method only applies to convention ICE vehicles.

U.S. Pat. No. 4,574,752 to Reichert, Jr., et al., also discloses an engine shutdown device for a conventional ICE and is particularly suited to stationary engine applications. It describes a controlled timed shutdown to reduce engine wear or system damage if problems arise in an external device powered by the engine. When Reichert"s method detects a fault in a peripheral device driven or controlled by the engine, it uses a relay, a fuel shutoff control, an engine throttle control, and a timer to shutdown the engine.

Prior art also reveals other developments to reduce fuel waste, emissions and dieseling during controlled engine shutdown for a conventional ICE. U.S. Pat. No. 4,366,790 to DeBoynton, discloses a by-pass system that stops fuel flow to an engine when combustion is not required. When this normally open by-pass valve is closed during events such as deceleration or engine shutdown, only filtered air at a reduced vacuum is allowed into the engine manifold. This prevents fuel waste. See also generally, U.S. Pat. No. 5,357,935 to Oxley, et al. Other systems have developed to maximize the amount of exhaust gas recirculation when an ICE is switched off to reduce emissions and dieseling. U.S. Pat. No. 4,367,720 to Miyoshi, et al.

U.S. Pat. No. 4,312,310 to Chivilo, et al., discloses an emissions prevention control system that stops engine fuel intake during idle conditions or deceleration and continues to spin the ICE with an auxiliary power unit such as an electric motor or hydraulic pressure. The motor keeps the engine spinning to allow subsequent fast start-up when normal driving conditions resume.

Although the prior art discloses engine shutdown systems for conventional ICEs, they do not meet the engine shutdown needs of an HEV. Thus, a system is needed that controls HEV engine shutdowns to preserve the HEV goal of reduced emissions.

SUMMARY OF INVENTION

Accordingly, an object of the present invention is to provide a controlled engine shutdown process for a hybrid electric vehicle (HEV).

It is a further object of the present invention to provide a method and system to control HEV engine shutdowns so as to achieve the HEV goal of reduced emissions (tailpipe and evaporative).

It is a further object of the present invention to provide a method and system to control HEV engine shutdowns that have specific controllers within a vehicle system controller and/or engine controller to: shut ("ramp") off fuel injectors; control engine torque via a throttle plate; control engine speed; stop spark delivery by disabling an ignition system; stop purge vapor flow by closing a VMV; stop exhaust gas recirculation flow by closing an EGR valve; and flush or clean out an engine intake manifold of residual fuel (vapor and puddles) once all sources of fuel are halted (injectors, VMV, and EGR valve).

It is a further object of the present invention to abort engine shutdown if the engine is commanded to run and the fuel injector ramping has not yet begun.

It is a further object of the present invention to shut off spark by disabling the ignition system when engine speed is less than a calibratable threshold.

It is a further object of the present invention to shut ("ramp") off fuel injectors in a calibratable manner, such as all injectors off at once, one injector off at a time, or two injectors off at a time.

It is a further object of the present invention to provide a power sustain system for controlled engine shutdown to complete in a "key-off" shutdown.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which:

FIG. 1 illustrates a general hybrid electric vehicle (HEV) configuration.

FIG. 4 illustrates a basic schematic of the vehicle system control, engine control unit, and a transaxle management unit.

DETAILED DESCRIPTION

Figure 2:
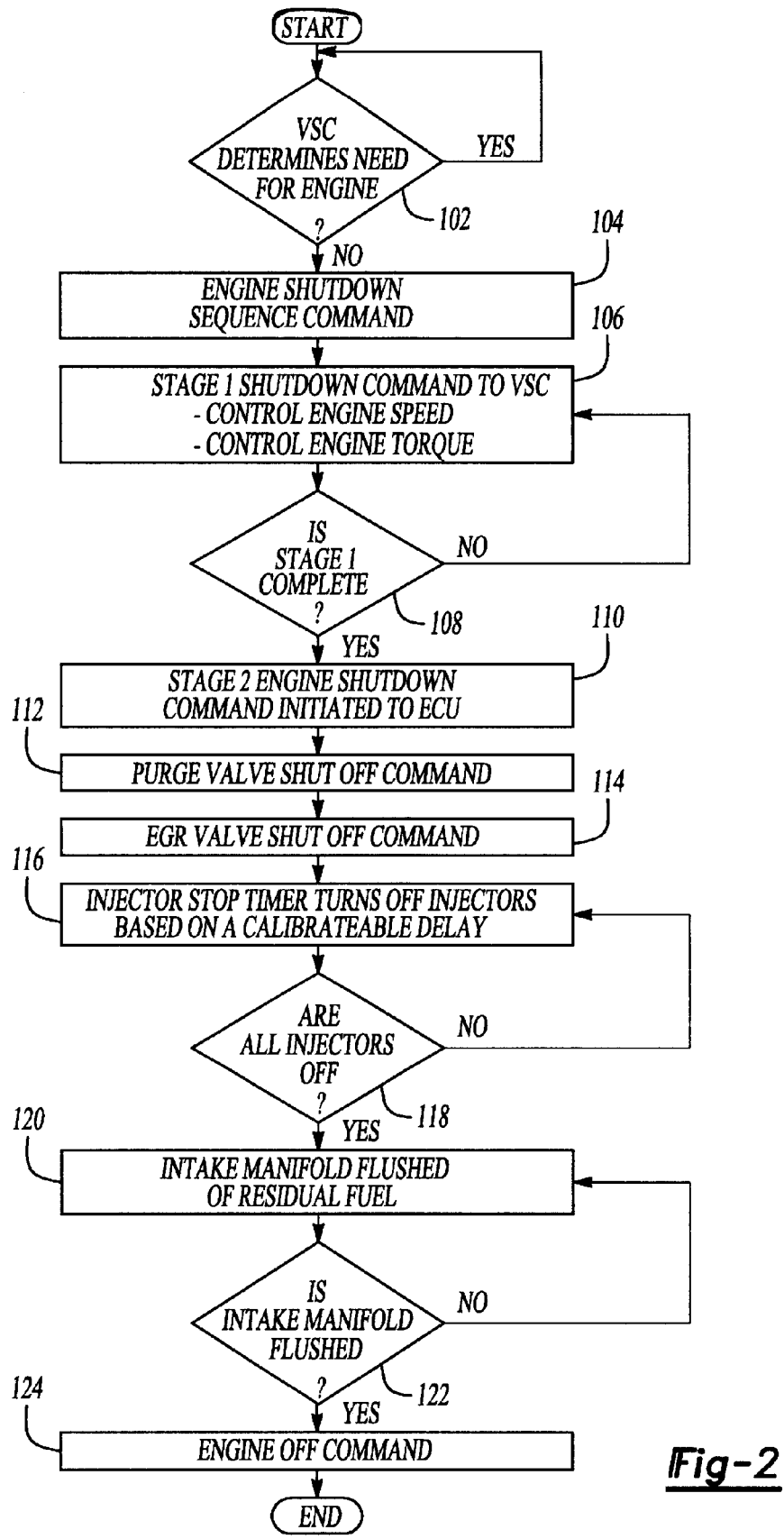
FIG. 2 illustrates a possible strategy of the controlled engine shutdown sequence for an HEV.

The present invention relates to electric vehicles and, more particularly, hybrid electric vehicles (HEVs). FIG. 1 demonstrates just one possible configuration, specifically a parallel/series hybrid electric vehicle (powersplit) configuration.

In a basic HEV, a planetary gear set 20 mechanically couples a carrier gear 22 to an engine 24 via an one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component"s controller. An engine control unit (ECU) 48 connects to the engine 24 via a hardwire interface. The ECU 48 and VSC 46 can be based in the same unit, but are actually separate controllers. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface.

It is in the VSC 46 and ECU 48 that coordination of a controlled engine 24 shutdown takes place to meet the objects of the present invention. At a predetermined moment when the VSC 46 determines it is best for the vehicle to run without the engine, such as low torque demand or a "key-off" from an operator, the VSC 46 initiates engine 24 shutdown by issuing a command to the ECU 48.

Figure 3:
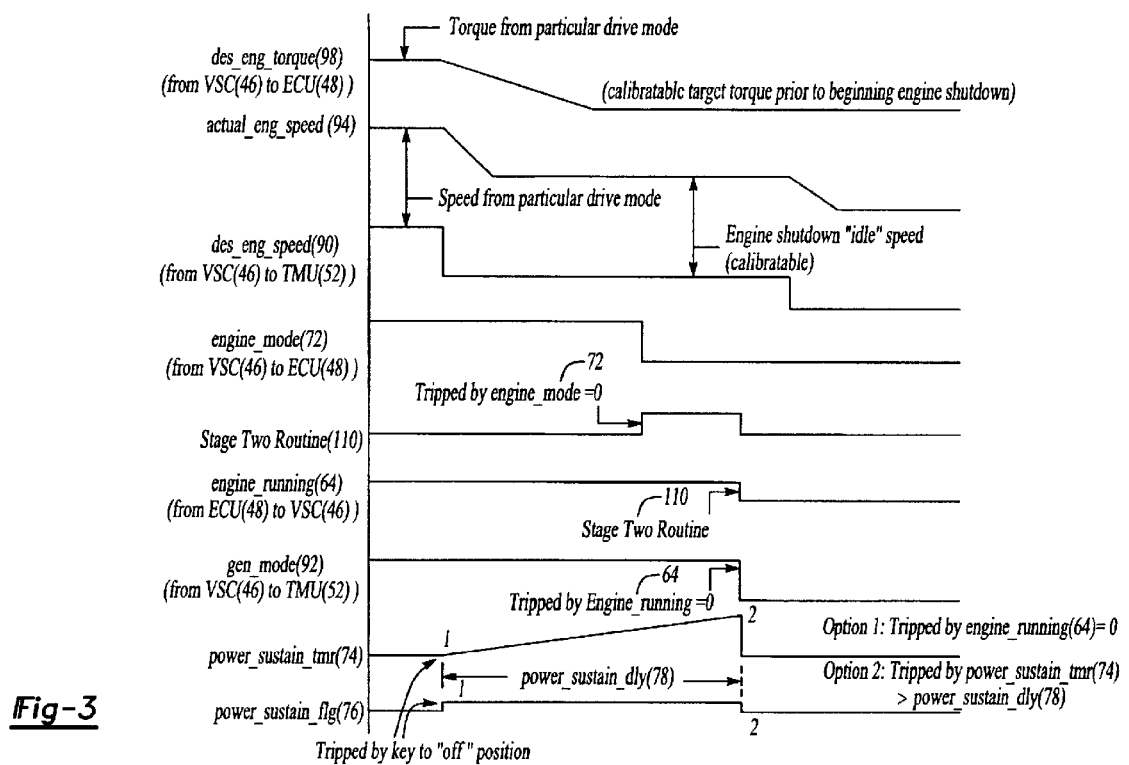
FIG. 3 illustrates stage one of the controlled engine shutdown sequence for an HEV.
Figure 5:
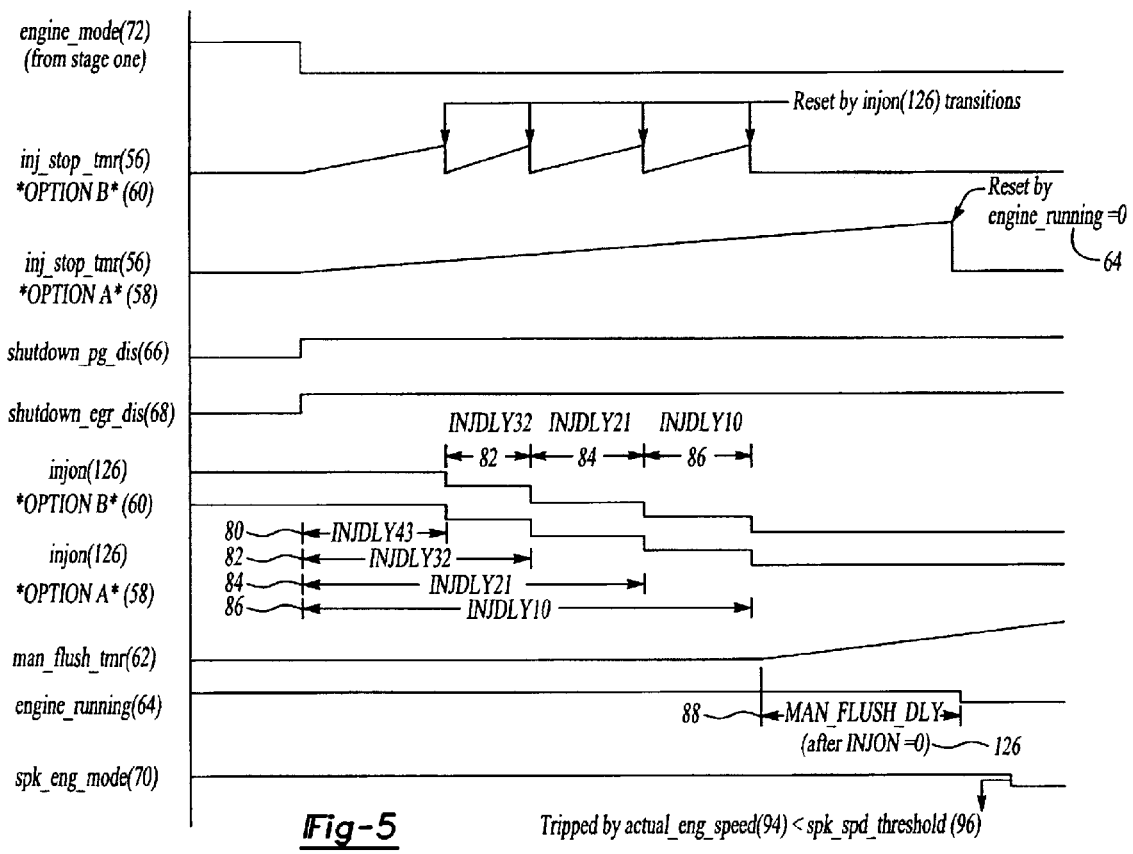
FIG. 5 illustrates stage two of the controlled engine shutdown sequence for a hybrid electric vehicle.

One possible engine 24 shutdown routine, that is the preferred embodiment of the present invention, is illustrated in FIGS. 2, 3 and 5. FIG. 2 shows a general strategy of the controlled engine shutdown sequence for an HEV.

In FIG. 2 at Step 102, the VSC 46 determines whether the engine 24 is needed. If the engine 24 is not needed (such as during a low-torque demand or a "key-off" from the operator) the strategy generates a command at Step 104 to the VSC 46 to begin stage one 106 of the engine 24 shutdown sequence. Stage one 106 controls engine 24 speed and engine 24 torque. Once stage one 106 is determined complete at step 108, the strategy issues a command for the ECU 48 to begin stage two 110 of the engine 24 shutdown sequence.

In stage two 110, the strategy generates a command for the ECU 48 to shut-off a purge valve at Step 112 to stop purge flow from a vapor management valve. Next, the strategy generates a command for the ECU 48 to shut-off an exhaust gas recirculation (EGR) valve at Step 114 to stop exhaust gas recirculation. Next, the strategy generates a command for the ECU 48 to an injector stop timer to shut ("ramp") off injectors based on a calibratable delay at Step 116. Once the strategy determines that all the injectors are off at Step 118, the strategy generates a command for the ECU 48 to flush an intake manifold of residual fuel at Step 120 when all sources of fuel are halted. Once the strategy determines that the intake manifold is flushed at Step 122, the strategy generates a command for the ECU 48 to shut-off the engine 24 at Step 124. This can be accomplished by disabling the ignition system so that no sparking occurs from the spark plugs (not shown).

FIG. 3 specifically illustrates stage one 106 of a HEV engine shutdown routine, and deals with the overall coordination of the engine shutdown by controlling the engine speed and torque (via electronic throttle control) prior to invoking stage two 110 of the engine shutdown sequence, while power is sustained to the controllers, ignition system, and fuel system (pump and injectors) if an optional "power sustain" feature is implemented for "key-off" engine shutdowns. FIG. 5 illustrates stage two 110, that is a more specific control of the engine components, such as fuel injectors, vapor management valve (VMV), and exhaust gas recirculation (EGR) valves, as well as the ability to "flush" the intake manifold of residual fuel if the optional "power sustain"feature is implemented for "key-off" engine shutdowns. Stage one 106 is illustrated in this preferred embodiment as being handled in the VSC 46, while stage two 110 is handled in the ECU 48. These "stages" do not necessarily need to be located in the controllers used in this illustrative example.

FIG. 3 (stage one 106) is a timeline going from left to right, as follows: DES_ENG_TORQUE 98=the desired engine 24 torque command from the VSC 46 to the ECU 48; control of desired engine torque directly controls engine throttle position, if a torque based electronic throttle controller system is used; in this case, with a known engine 24 map, a desired engine 24 brake torque can be broken down into desired engine 24 indicated torque, then to desired engine 24 airflow, and then finally to desired engine 24 throttle position.

ACTUAL_ENG_SPEED 94=the actual engine 24 speed as measured by a crankshaft position sensor (not shown), read by the ECU 48, and sent to the VSC 46.

DES_ENG_SPEED 90=the desired engine 24 speed command from the VSC 46 to the TMU 52; the TMU 52 has the generator motor 30 in "speed" control for most driving and the VSC 46 sets the target speed of the generator motor 30 via this DES_ENG_SPEED 90 command. Generator motor 30 and engine 24 speed are always proportional to each other because they are mechanically coupled in the planetary gear set 20.

ENGINE_MODE 72=the mode command from VSC 46 to ECU 48; 0=engine 24 commanded to be off, 1=engine 24 commanded to be on; this is what starts stage two 110 of the engine shutdown routine as illustrated in FIG. 5.

ENGINE_RUNNING 64=flag indicating whether the engine 24 is running (i.e., making combustion and torque); 0=engine 24 not running (off), 1=engine 24 is running (on). This flag is set to 0 in stage two 110 of the engine shutdown routine as illustrated in FIG. 5 when conditions are met, and then sent from the ECU 48 to the VSC 46.

Stage two routine indicator 110=this routine begins when ENGINE_MODE 72=0. Illustrated with specificity in FIG. 5.

GEN_MODE 92=the mode command from the VSC 46 to the TMU 52; 1=speed control, 0=spin engine to a stop (0 speed).

POWER_SUSTAIN_TMR 74=timer that begins when the key is turned "OFF" and then runs until a calibratable power sustain delay time is met (POWER_SUSTAIN_DLY 78) or when ENGINE_RUNNING 64=0, depending on which option is implemented.

POWER_SUSTAIN_FLG 76=flag set inside the VSC 46 that, when=1, sustains power to all the controllers, the ignition system, and the fuel system (pump and injectors); flag is set to 1 when the key is turned "OFF", and cleared to 0 when POWER_SUSTAIN_TMR 74 exceeds POWER_SUSTAIN_DLY 78 or when ENGINE_RUNNING 64=0, depending on which option is implemented.

FIG. 4 shows schematically the interaction of the VSC 46 with the TMU 52 and the ECU 48 as described above.

FIG. 5 (Stage two 110) is also a timeline read from left to right, as follows: ENGINE_MODE 72=the mode command from VSC 46 to ECU 48 that is set in stage one 106, as illustrated in FIG. 3; 0=engine 24 commanded to be off, 1=engine 24 commanded to be on; this is what starts stage two 110 of the engine shutdown routine as illustrated in FIG. 5.

INJ_STOP_TMR 56=(IF OPTION A 58)=timer that begins when the command to do the shutdown is given (ENGINE_MODE 72=0) and then runs until all the injectors are shut ("ramped") off; each injector is shut off based on a calibratable delay relative to when the shutdown command was given.

(IF OPTION B 60)=timer that begins when the command to do the shutdown is given (ENGINE_MODE 72=0) and then gets reset each time one of the injectors is shut off; each injector is shut off based on a calibratable delay relative to when the last injector was shut off.

SHUTDOWN_PG_DIS 66=flag requesting that a purge valve be unconditionally shut off for the shutdown process.

SHUTDOWN_EGR_DIS 68=flag requesting that the exhaust gas recirculation (EGR) valve be unconditionally shut off for the shutdown process.

INJON 126=actual number of fuel injectors commanded ON (maximum is 4 for this 4-cylinder illustrative example).

MAN_FLUSH_TMR 62=timer that begins when all the injectors have been COMMANDED OFF (via INJON 126=0) to allow for the intake manifold to be flushed of residual fuel (vapor and liquid).

ENGINE_RUNNING 64=flag indicating whether the engine 24 is running (i.e., making combustion and torque); 0=engine 24 not running (off), 1=engine 24 is running (on). This flag is set to 0 when a manifold "flushing" process is complete (MAN_FLUSH_TMR 62>MAN_FLUSH_DLY 88) and then sent from the ECU 48 to the VSC 46.

SPK_ENG_MODE 70=spark shutoff command; 0=disable ignition system (i.e., do not allow spark plugs to fire), 1=enable ignition system (i.e., allow spark plugs to fire). This command is set to 1 when ACTUAL_ENG_SPEED 94 falls below a calibratable threshold (SPK_SPD_THRESHOLD 96).

Stages one 106 and two 110 of the engine 24 shutdown routine have the following calibratable parameters (Note: While this example applies only to a four cylinder engine 24, it can easily be adapted to other engines with different cylinder configurations using the same type of parameters.): INJDLY43 80=time delay from receiving the engine 24 shutdown command (ENGINE_MODE 72=0) to when ONE injector is shut off (either OPTION A 58 or OPTION B 60).

INJDLY32 82=time delay from receiving the engine 24 shutdown command (ENGINE_MODE 72=0) to when TWO injectors are shut off (OPTION A 58), or=time delay from one injector having been shut off (INJON 126=3) to when TWO injectors are shut off (OPTION B 60).

INJDLY21 84=time delay from receiving the engine 24 shutdown command (ENGINE_MODE 72=0) to when THREE injectors are shut off (OPTION A 58), or=time delay from two injectors having been shut off (INJON 126=2) to when THREE injectors are shut off (OPTION B 60).

INJDLY10 86=time delay from receiving the engine 24 shutdown command (ENGINE_MODE 72=0) to when ALL FOUR injectors are shut off (OPTION A 58), or =time delay from three injectors having been shut off (INJON 126=1) to when ALL FOUR injectors are shut off (OPTION B 60).

MAN_FLUSH_DLY 88=time delay from when the engine 24 has stopped fueling (INJON 126=0) to when the intake manifold has been sufficiently cleaned of residual fuel (vapor and liquid); the engine 24 will continue to be spun by the VSC 46 until this calibratable delay has expired.

SPK_SPD_THRESHOLD 96=engine speed below which the ignition system is disabled (i.e., spark plugs are not fired).

POWER_SUSTAIN_DLY 78=time delay from when POWER_SUSTAIN_TMR 74 begins counting to when POWER_SUSTAIN_FLG 76 is cleared to 0.

The engine 24 shutdown routine of the present invention accomplishes the HEV objectives described in the prior art review. First, the routine unconditionally disables purge and EGR (i.e., shuts the valves immediately) via SHUTDOWN_PG_DIS 66 and SHUTDOWN_EGR_DIS 68 to close off these sources of fuel. Second, the routine shuts ("ramps") off the fuel injectors (the primary source of fuel) in a controlled and calibratable manner (e.g., all injectors shut off at once, or two at a time, or one at a time) via INJON 126. Additionally, an abort command is added to the shutdown process if injector shut off ("ramping") has not yet begun. For example, the shutdown would abort if INJON 126>=4 (or the total number of engine cylinders) and ENGINE_MODE 72 is not=0. Again, shutting off these three sources of fuel helps to create a repeatable and consistent fuel condition in the intake manifold (vapor and liquid) at the end of engine shutdown so that it is easier to control the amount of fuel for optimal air/fuel ratio during the following engine restart.

And finally, if engine shutdown is implemented with a power sustain system (POWER_SUSTAIN_TMR 74, POWER_SUSTAIN_FLG 76, and POWER_SUSTAIN_DLY 78) to the controllers, the ignition system, and the fuel system (pump and injectors), the VSC 46 can continue to spin the engine 24 even though the injectors are off (INJON 126=0) to "flush" residual fuel out of the intake manifold into the cylinders, combust the fuel (even if partially) in the combustion chamber by the continued firing of the spark plugs, and then converting the combustion byproducts once delivered to the hot catalytic converter.

The ENGINE_RUNNING 64 flag is set to 0 once the flushing process is complete and the routine shuts off engine 24 spark completely once ACTUAL_ENG_SPEED 94 has fallen below a calibratable level (SPSPD_THRESHOLD 96). Typically, even with the "power sustain" option active, the engine 24 will continue to spin for only a few seconds (2 or 3) after "key-off" so that the driver does not perceive a problem with the engine 24 continuing to run when not expected.

The above-described embodiment(s) of the invention is/are provided purely for purposes of example. Many other variations, modifications, and applications of the invention may be made.

What is claimed is:

1. A system to control an engine shutdown for a hybrid electric vehicle (HEV) comprising at least one control unit operating to:

control engine torque;

control engine speed;

stop purge flow from a vapor management valve (VMV);

stop exhaust gas recirculation (EGR)flow from an EGR valve;

ramp off fuel injectors;

flush an engine intake manifold of residual fuel once all sources of fuel are halted; and disable an ignition system.

2. The system of claim 1 further comprising an abort engine shutdown control to abort the system if engine need is resumed and fuel injector ramping has not yet begun.

3. The system of claim 1 further comprising a power sustain control after an engine "key off" to allow a generator to continue to spin the engine after injectors are shut off, whereby residual fuel is flushed from the engine intake manifold into engine cylinders to be combusted, then delivered to a hot catalytic converter.

4. The system of claim 1 wherein the control to ramp off the fuel injectors ramps the fuel injectors off in a calibratable manner.

5. The system of claim 4 wherein a fuel injector calibration ramps all injectors off at once.

6. The system of claim 4 wherein a fuel injector calibration ramps one injector off at a time.

7. The system of claim 4 wherein a fuel injector calibration ramps two injectors off at a time.

8. The system of claim 1 wherein a spark control shuts off spark when engine speed is less than some calibratable level.

9. A method to control an engine shutdown for a hybrid electric vehicle (HEV) comprising the steps of:

ramping off fuel injectors;

controlling engine torque;

controlling engine speed;

disabling an ignition system;

stopping purge flow from a vapor management valve (VMV);

stopping exhaust gas recirculation (EGR) flow from an EGR valve; and flushing an engine intake manifold of residual fuel after halting all sources of fuel in the fuel injectors, VMV, and EGR valve.

10. The method of claim 9 further comprising the step of aborting HEV engine shutdown if engine need is resumed and fuel injector ramping has not yet begun.

11. The method of claim 9 further comprising the step of sustaining power after "keying-off" the engine and vehicle to allow a generator to continue spinning the engine after fuel injectors are shut off, whereby residual fuel is flushed from an engine intake manifold into engine cylinders to be combusted then delivered to a hot catalytic converter.

12. The method of claim 9 further comprising the step of shutting off spark when engine speed is less than a calibratable level.

13. The method of claim 9 wherein the step of ramping off fuel injectors is done in a calibratable manner.

14. The method of claim 13 wherein the step of ramping off fuel injectors turns all injectors off at once.

15. The method of claim 13 wherein the step of ramping off fuel injectors turns one injector off at a time.

16. The method of claim 13 wherein the step of ramping off fuel injectors turns two injectors off at a time.

\* \* \* \* \*